US012427593B2

(12) United States Patent
Ford

(10) Patent No.: US 12,427,593 B2
(45) Date of Patent: Sep. 30, 2025

(54) GIN BLADE SHARPENING SYSTEM AND METHOD OF USE

(71) Applicant: Ford Gin Services LLC, Lubbock, TX (US)

(72) Inventor: Daniel Ford, Lubbock, TX (US)

( * ) Notice: Subject to any disclaimer, the term of this patent is extended or adjusted under 35 U.S.C. 154(b) by 543 days.

(21) Appl. No.: 17/804,523

(22) Filed: May 27, 2022

(65) Prior Publication Data
US 2022/0379394 A1    Dec. 1, 2022

Related U.S. Application Data

(60) Provisional application No. 63/193,681, filed on May 27, 2021.

(51) Int. Cl.
| | | |
|---|---|---|
| *B23D 63/14* | (2006.01) | |
| *B24B 3/46* | (2006.01) | |
| *B24B 3/58* | (2006.01) | |
| *B24B 27/00* | (2006.01) | |
| *B24B 41/02* | (2006.01) | |
| *B24B 53/00* | (2006.01) | |

(52) U.S. Cl.
CPC ............... *B23D 63/14* (2013.01); *B24B 3/46* (2013.01); *B24B 3/58* (2013.01); *B24B 27/0023* (2013.01); *B24B 27/0076* (2013.01); *B24B 41/02* (2013.01); *B24B 53/005* (2013.01); *B24B 27/0046* (2013.01)

(58) Field of Classification Search
CPC ............ B24B 27/0023; B24B 27/0046; B24B 27/0076; B24B 27/0015; B24B 27/0038; B24B 27/0084; B24B 3/58; B24B 3/40; B24B 3/46; B24B 3/463; B24B 3/466; B23D 63/14; B26D 7/12
USPC .................................. 451/340, 224, 234, 254
See application file for complete search history.

(56) References Cited

U.S. PATENT DOCUMENTS

| | | | | |
|---|---|---|---|---|
| 2,565,916 | A * | 8/1951 | Frusher ................... | B24B 3/466 76/85 |
| 3,952,616 | A * | 4/1976 | Varley ..................... | B24B 25/00 451/236 |
| 4,173,846 | A * | 11/1979 | Steiner ..................... | B26D 7/12 451/422 |
| 4,846,023 | A * | 7/1989 | Emter .................. | B23D 63/123 76/41 |
| 6,109,137 | A * | 8/2000 | Lenard ..................... | B24B 3/00 76/43 |
| 6,332,375 | B1 * | 12/2001 | Randl .................... | B23D 63/12 76/43 |
| 9,233,428 | B2 * | 1/2016 | Williams ............. | B23D 63/123 |

(Continued)

*Primary Examiner* — Makena S Markman
(74) *Attorney, Agent, or Firm* — Shannon Warren

(57) ABSTRACT

A gin blade sharpening system for sharpening a blank into a blade disk. The gin blade sharpening system comprises two or more grinding stations, a controller, and one or more upper grinders. The one or more upper grinders comprise at least a first upper grinder. The two or more grinding stations comprise at least a first grinding station and a second grinding station. Each among the two or more grinding stations comprise a clamp assembly configured to selectively hold the blade disk in a substantially horizontal position. A portion of the one or more upper grinders can be configured to sharpen an outer perimeter edge of the blade disk using an abrasive pad.

14 Claims, 11 Drawing Sheets

(56) References Cited

U.S. PATENT DOCUMENTS

| | | | |
|---|---|---|---|
| 11,752,591 B2* | 9/2023 | Vasko | B24B 49/16 |
| | | | 451/5 |
| 2011/0237166 A1* | 9/2011 | Chang | B23D 63/005 |
| | | | 451/279 |
| 2012/0309266 A1* | 12/2012 | Schroeder | B24B 49/12 |
| | | | 451/6 |
| 2014/0331838 A1* | 11/2014 | Baker | B24B 3/46 |
| | | | 451/529 |
| 2015/0068378 A1* | 3/2015 | Barsotti Giovanni | B26D 7/12 |
| | | | 451/263 |
| 2020/0171615 A1* | 6/2020 | Chiocchetti | B26D 7/12 |

* cited by examiner

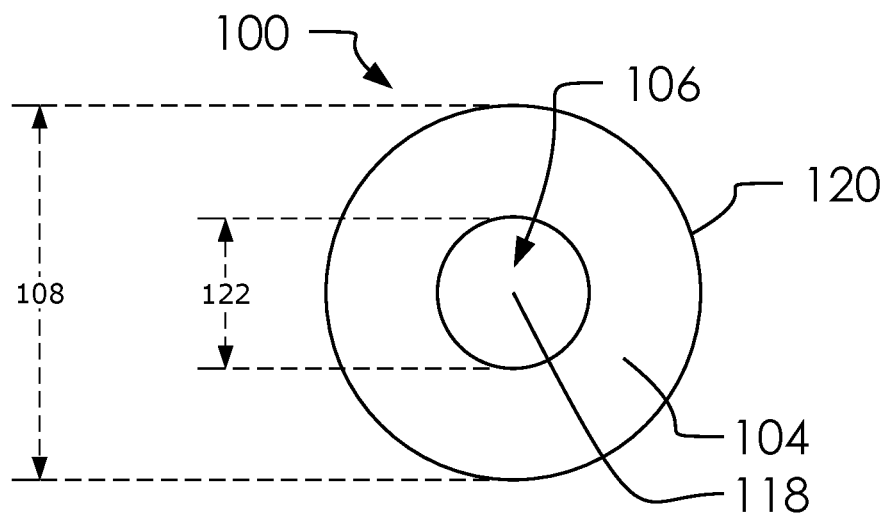
FIG. 1A
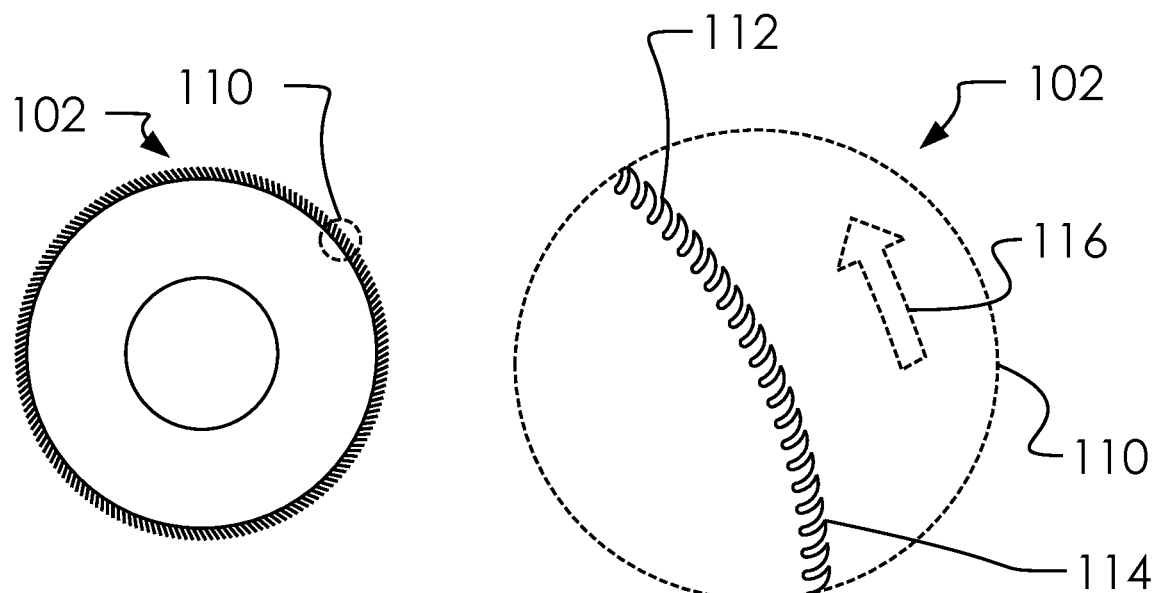
FIG. 1B
FIG. 1C

GIN BLADE SHARPENING SYSTEM AND METHOD OF USE

CROSS-REFERENCE TO RELATED APPLICATIONS

This application claims benefit to U.S. provisional patent application No. 42/835,443 filed 2021 May 27.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

A prior art grinding assembly a gin blade sharpening system for sharpening a blank into a blade disk. Said gin blade sharpening system comprises two or more grinding stations, a controller, and one or more upper grinders. Said one or more upper grinders comprise at least a first upper grinder. Said two or more grinding stations comprise at least a first grinding station and a second grinding station. each among said two or more grinding stations comprise a clamp assembly configured to selectively hold said blade disk in a substantially horizontal position. A portion of said one or more upper grinders are configured to sharpen an outer perimeter edge of said blade disk using an abrasive pad. Said controller is configured to selectively operate said two or more grinding stations, said one or more upper grinders and one or more lower grinders using a device program. Said gin blade sharpening system comprises an upper grinder position control assembly configured to move said one or more upper grinders between said two or more grinding stations. Said one or more upper grinders are configured to travel between a first x-axis location and a second x-axis location using said upper grinder position control assembly. Said first x-axis location and said second x-axis location correspond to said first grinding station and said second grinding station. Said device program is configured to schedule use of said one or more upper grinders as between said two or more grinding stations. At least two among said two or more grinding stations are configured to rotate in an advantageous direction to avoid grinding into a tooth orientation. Said gin blade sharpening system is configured to sharpen a top surface, and a bottom surface separately in said first grinding station and said second grinding station. By sharpening said top surface and said bottom surface separately, said blank results in a flatter said blade disk, with lower consumption of said abrasive pad.

Said gin blade sharpening system for sharpening said blade disk with improved manufacturing characteristics and higher quality output of said blade disk. Said gin blade sharpening system comprises said two or more grinding stations, said controller, and said one or more upper grinders. Said one or more upper grinders comprise at least said first upper grinder. Said two or more grinding stations comprise at least said first grinding station and said second grinding station. Each among said two or more grinding stations comprise said clamp assembly configured to selectively hold said blade disk in a substantially horizontal position. a portion of said one or more upper grinders are configured to sharpen said outer perimeter edge of said blade disk using said abrasive pad. Said controller is configured to selectively operate said two or more grinding stations, said one or more upper grinders and said one or more lower grinders using said device program. At least two among said two or more grinding stations are configured to rotate in an advantageous direction to avoid grinding into said tooth orientation. Said gin blade sharpening system is configured to sharpen said top surface, and said bottom surface separately in said first grinding station and said second grinding station. By sharpening said top surface and said bottom surface separately, said blank results in a flatter said blade disk, with lower consumption of said abrasive pad. A mounting bracket is configured to receive and hold an upper grinder motor with said abrasive pad on a vertical movement assembly. Each among said one or more upper grinders further comprise said mounting bracket. Said mounting bracket is configured to allow said upper grinder motor and said abrasive pad to mount at an upper grind angle. Each among said one or more upper grinders are adjusted to a pitch relative to said blank in order to adjust a grind angle in a sharpened edge of said blank. Said upper grind angle of said one or more upper grinders are adjusted automatically or by adjusting a mounting position of said upper grinder motor to accomplish said upper grind angle. Said mounting bracket is configured to move in a z-direction on said vertical movement assembly to adjust a height and engagement of said abrasive pad with said blank.

Said gin blade sharpening system for sharpening said blade disk with improved manufacturing characteristics and higher quality output of said blade disk. Said gin blade sharpening system comprises said two or more grinding stations, said controller, and said one or more upper grinders. Said one or more upper grinders comprise at least said first upper grinder. Said two or more grinding stations comprise at least said first grinding station and said second grinding station. Each among said two or more grinding stations comprise said clamp assembly configured to selectively hold said blade disk in a substantially horizontal position. A portion of said one or more upper grinders are configured to sharpen said outer perimeter edge of said blade disk using said abrasive pad. Said controller is configured to selectively operate said two or more grinding stations, said one or more upper grinders and said one or more lower grinders using said device program.

BRIEF DESCRIPTION OF THE SEVERAL VIEWS OF THE DRAWING

FIGS. 1A, 1B and 1C illustrate an elevated top view of a blank 100, and an elevated top view and detailed view of a blade disk 102.

FIGS. 8A, 8B, and 8C illustrate a block diagram of said blade disk 102 with said first upper grinder 406a and a first lower grinder 408a.

DETAILED DESCRIPTION OF THE INVENTION

Figure 2A:
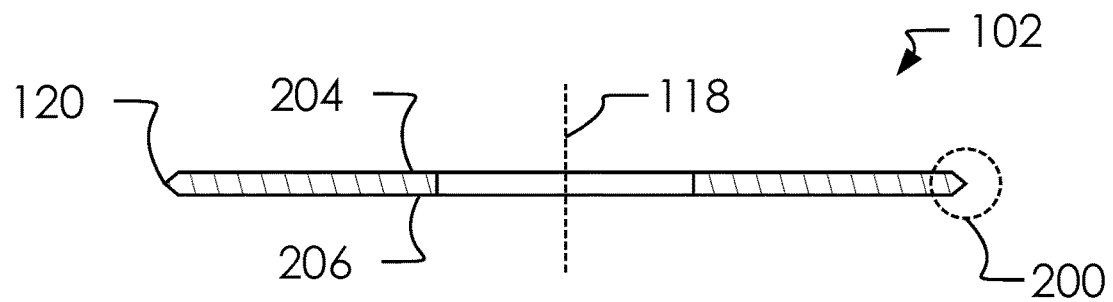
FIGS. 2A, and 2B illustrate an elevated cross-section side overview and detailed view of said blade disk 102.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIGS. 1A, 1B and 1C illustrate an elevated top view of a blank 100, and an elevated top view and detailed view of a blade disk 102.

Said blank 100 can comprise an unpunched and unsharpened version of said blade disk 102, as described herein and known in the art.

Said blank 100 and said blade disk 102 can comprise a round disc having a body portion 104, a center aperture 106, a diameter 108, and a center aperture diameter 122. Said body portion 104 can be a metal disk.

As shown in a detailed call-out 110 of said blade disk 102, said blank 100 can be punched to create a plurality of punched teeth 112 and a sharpened edge 114 (illustrated below). In one embodiment, said plurality of punched teeth 112 can be aligned in a tooth orientation 116 being relative to a center point 118 of said body portion 104 and on an outer perimeter edge 120 of said body portion 104.

Once punched said plurality of punched teeth 112 can be distributed evenly around said outer perimeter edge 120, as is known in the art.

In one embodiment, said blank 100 can be punched so as to add said plurality of punched teeth 112 to form an unsharpened punched blank, which needs to be sharpened as discussed below in order to create said blade disk 102.

Figure 2B:
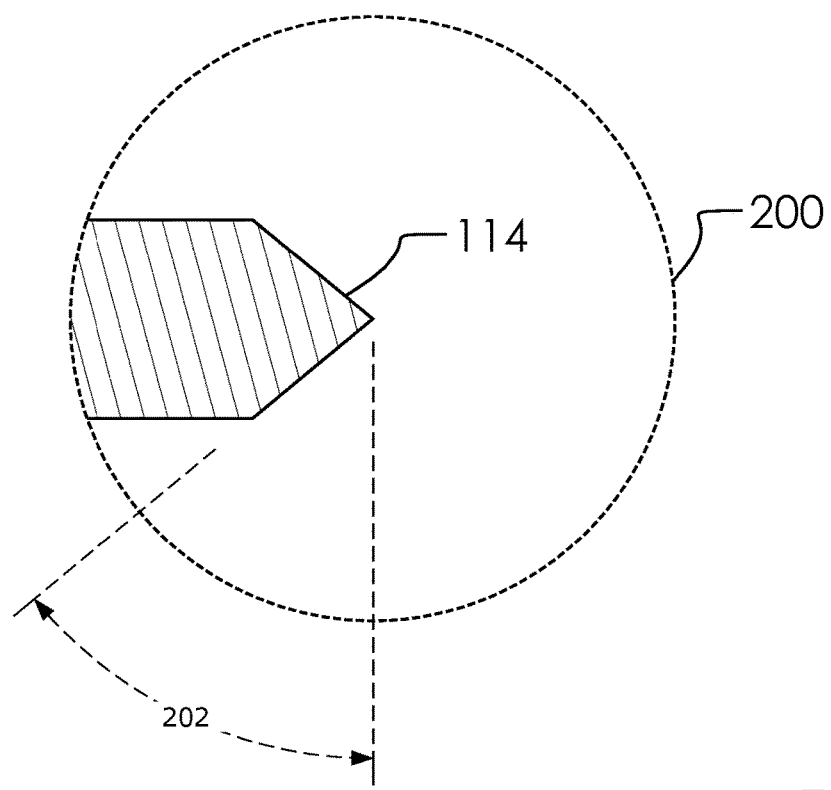

FIGS. 2A, and 2B illustrate an elevated cross-section side overview and detailed view of said blade disk 102.

As shown in a call-out 200, said outer perimeter edge 120 can be ground to said sharpened edge 114 at a grind angle 202.

Said blank 100 and said blade disk 102 can comprise a top surface 204 and a bottom surface 206.

Figure 3:
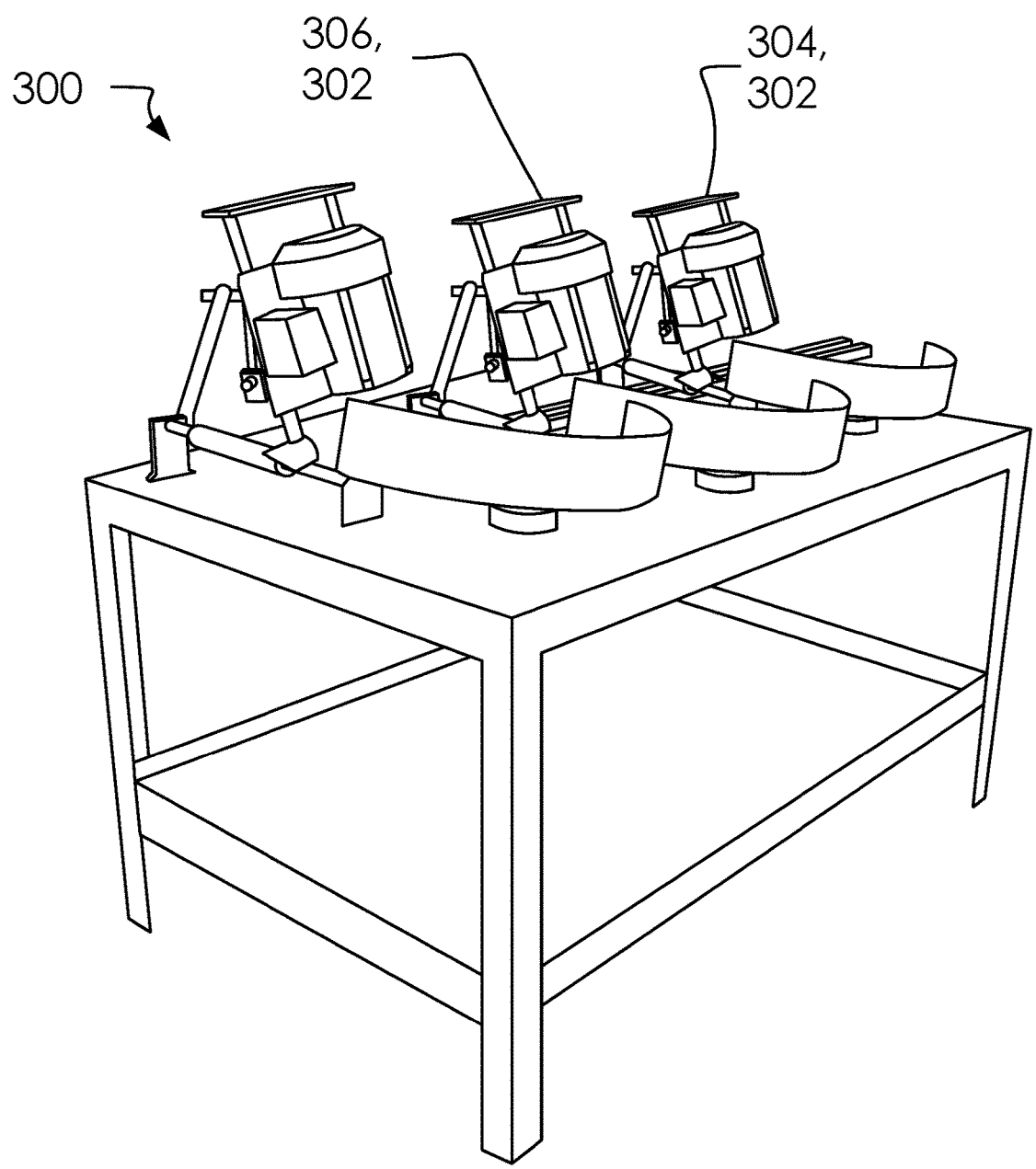
FIG. 3 illustrates a perspective overview of a prior art grinding assembly 300.

FIG. 3 illustrates a perspective overview of a prior art grinding assembly 300.

Said prior art grinding assembly 300 comprised a plurality of spinning stations 302 configured for receiving said unsharpened punched blank in a first station 304 among said plurality of spinning stations 302, spinning, sharpening on said top surface 204, and then flipped onto a second station 306 for the reverse treatment to sharpen said bottom surface 206. One shortcoming of this approach comprises constant manpower input and disproportionate wear of abrasive pads between said plurality of spinning stations 302. This is caused by griding against said tooth orientation 116 on one station and with said tooth orientation 116 at another station. In one use case, the abrasive pad used against said tooth orientation 116 require diamond grade abrasive, which raises the cost of griding by a factor of six.

Figure 4:
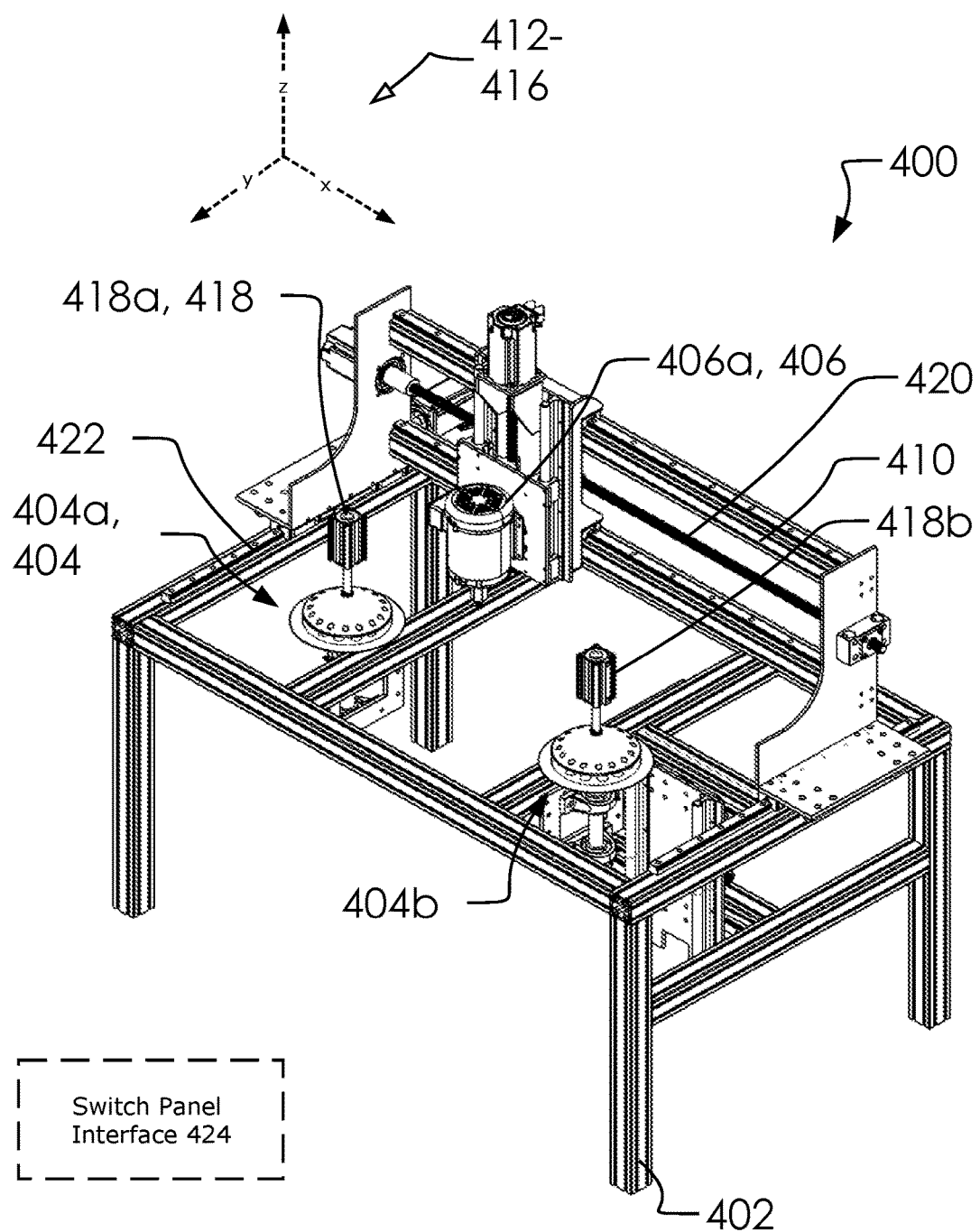
FIG. 4 illustrates a perspective overview of a gin blade sharpening system 400.

FIG. 4 illustrates a perspective overview of a gin blade sharpening system 400.

In one embodiment, said gin blade sharpening system 400 can comprise a frame structure 402, two or more grinding stations 404, one or more upper grinders 406, one or more lower grinders 408, an upper grinder position control assembly 410.

Each among said two or more grinding stations 404 can comprise a clamp assembly 418.

Said two or more grinding stations 404 can comprise a first grinding station 404a, a second grinding station 404b, and a third grinding station 404c. Said one or more upper grinders 406 can comprise a first upper grinder 406a, and a second upper grinder 406b. Said one or more lower grinders 408 can comprise a first lower grinder 408a, and a second lower grinder 408b.

Where said two or more grinding stations 404 comprises three stations, said clamp assembly 418 can be referred to as a first clamp assembly 418a, a second clamp assembly 418b, and a third clamp assembly 418c.

In one embodiment, said upper grinder position control assembly 410 can move said one or more upper grinders 406 in an x-direction 412, a y-direction 414 or a z-direction 416.

In one embodiment, said one or more lower grinders 408 are positioned relative to said clamp assembly 418 for use on said bottom surface 206 and said outer perimeter edge 120 of said blank 100.

In one embodiment, said one or more upper grinders 406 and said one or more lower grinders 408 can be driven by a motor, such as an electric motor, as is known in the art.

Said gin blade sharpening system 400 can further comprise an x-axis threaded shaft 420 and a y-axis threaded shaft 422. Portions of said upper grinder position control assembly 410 can travel on said x-axis threaded shaft 420 and said y-axis threaded shaft 422 to adjust a location of said one or more upper grinders 406 according to an operator's preference.

Said gin blade sharpening system 400 can comprise a switch panel interface 424 for operator interaction with said gin blade sharpening system 400.

Figure 5:
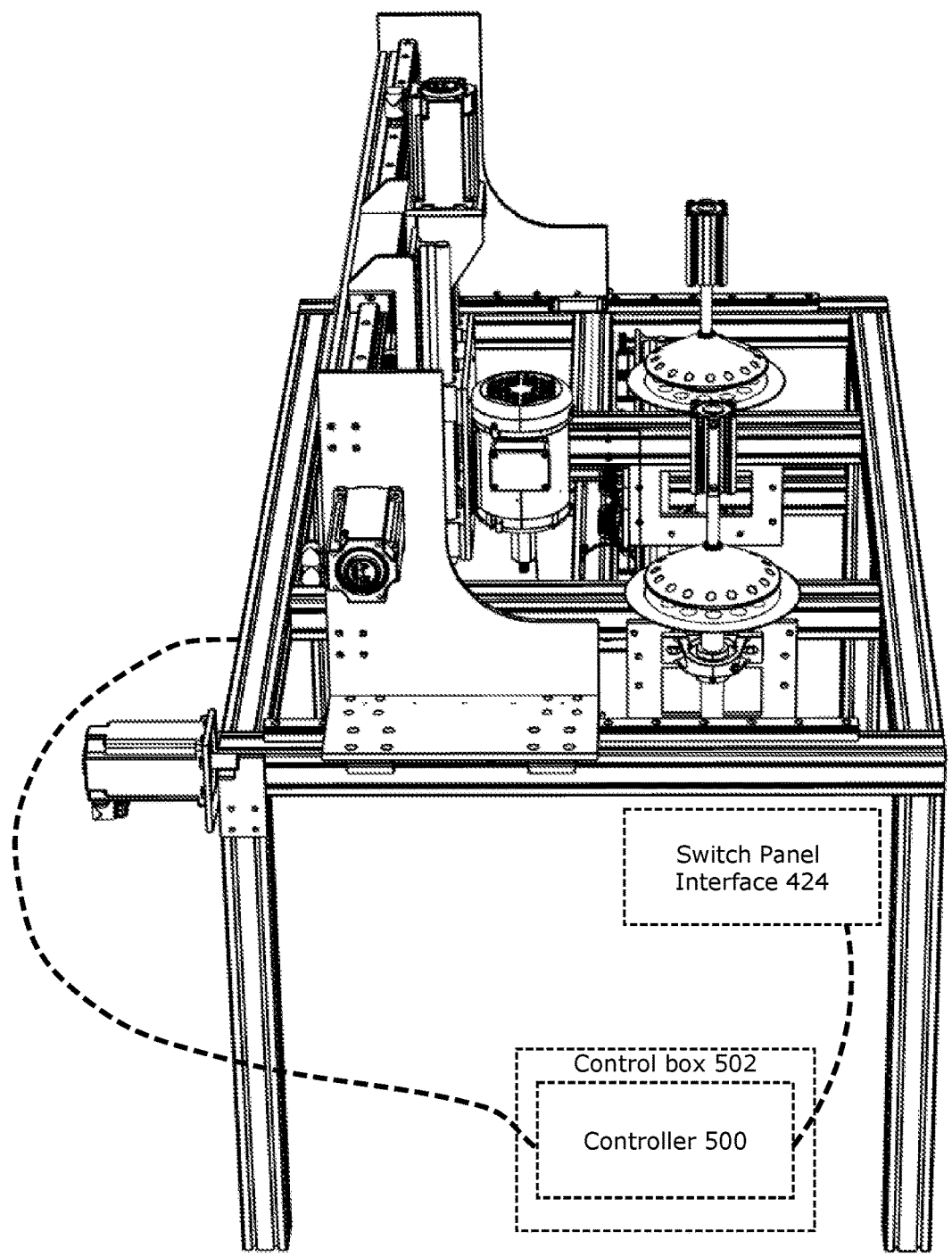
FIG. 5 illustrates a perspective side view of said gin blade sharpening system 400.

FIG. 5 illustrates a perspective side view of said gin blade sharpening system 400.

In one embodiment, said gin blade sharpening system 400 can comprise a controller 500 in a controller box 502, and an HMI 504 (not illustrated here) for interactions between said gin blade sharpening system 400 and its operators.

As is known in the art, said HMI 504 can stand for Human Machine Interface. In one embodiment, said switch panel interface 424 can suffice for control of said gin blade sharpening system 400, but in another embodiment, said gin blade sharpening system 400 can be controlled by a software system with a user interface.

Figure 6:
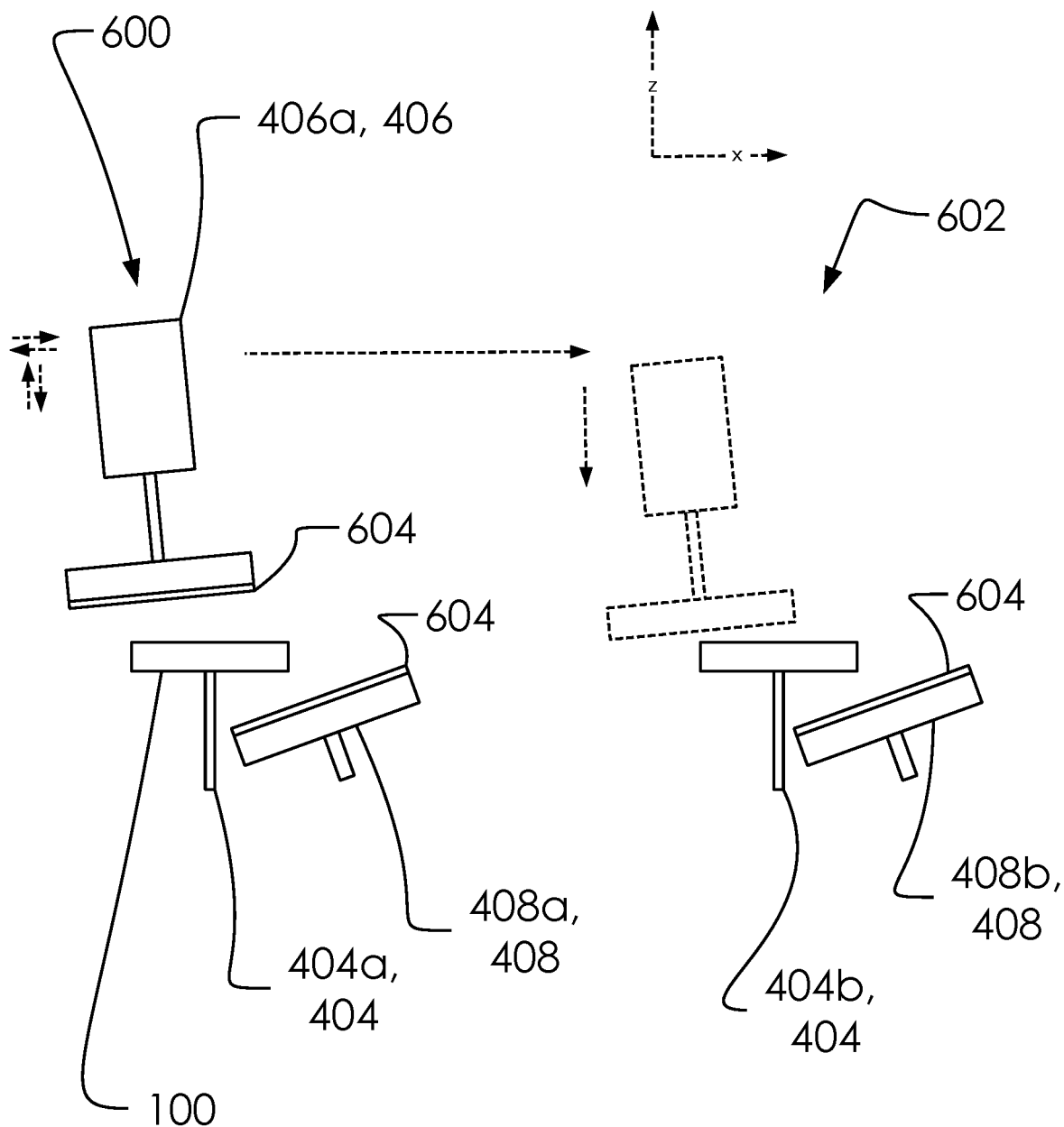
FIG. 6 illustrates a block diagram of one or more upper grinders 406 moving in an x-direction 412 and a z-direction 416 between two or more grinding stations 404.

FIG. 6 illustrates a block diagram of said one or more upper grinders 406 moving in said x-direction 412 and said z-direction 416 between said two or more grinding stations 404.

As shown, said one or more upper grinders 406 can travel between a first x-axis location 600 and a second x-axis location 602 using said upper grinder position control assembly 410. Wherein, said first x-axis location 600 and said second x-axis location 602 correspond to said first grinding station 404*a* and said second grinding station 404*b*. Accordingly, said controller 500 can schedule use of said one or more upper grinders 406 within the context of said gin blade sharpening system 400 and said two or more grinding stations 404.

One advantage of moving said one or more upper grinders 406 between said two or more grinding stations 404 can involve saving on equipment costs in purchasing said one or more upper grinders 406, another can involve allowing said blank 100 to be addressed one side at a time. That is, to grind on said top surface 204 with said one or more upper grinders 406 at said first grinding station 404*a* and said bottom surface 206 with said second lower grinder 408*b* at said second grinding station 404*b*, then move said first upper grinder 406*a* to said second x-axis location 602 and grind on said top surface 204 at said second grinding station 404*b* and said bottom surface 206 at said first grinding station 404*a*.

Consequently, warping and overheating said blank 100 can be avoided by separating treatment of said top surface 204 and said bottom surface 206. Additionally, each of said two or more grinding stations 404 can be rotated in an advantageous direction to avoid grinding into said tooth orientation 116. Thus, multistage treatment of said blank 100 can result in truer, flatter versions of said blade disk 102, with lower consumption of an abrasive pad 604 and said one or more lower grinders 408.

Figure 7:
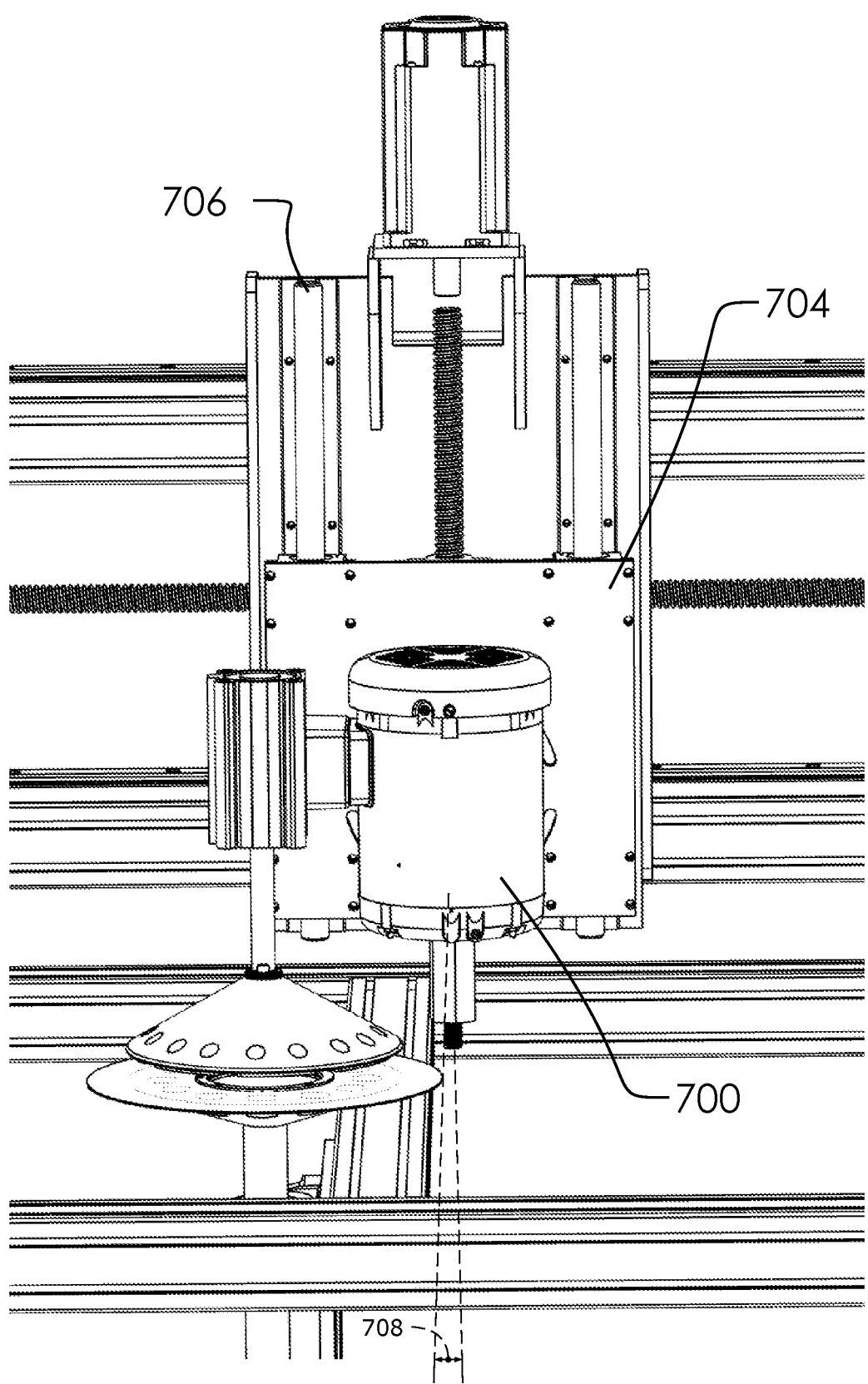
FIG. 7 illustrates a perspective overview of a first upper grinder 406a on an upper grinder position control assembly 410.

FIG. 7 illustrates a perspective overview of said first upper grinder 406*a* on said upper grinder position control assembly 410.

In one embodiment, each among said one or more upper grinders 406 can comprise an upper grinder motor 700, said abrasive pad 604, a mounting bracket 704, and a vertical movement assembly 706. Said upper grinder motor 700 can selectively drive said abrasive pad 604. Said mounting bracket 704 can receive and hold said upper grinder motor 700 with said abrasive pad 604 on said vertical movement assembly 706.

As illustrated, said abrasive pad 604 and is removed from said upper grinder motor 700.

In one embodiment, said mounting bracket 704 can allow said upper grinder motor 700 and said abrasive pad 604 to mount at an upper grind angle 708. Wherein, each among said one or more upper grinders 406 can be adjusted to a pitch relative to said blank 100 to adjust said grind angle 202 in said sharpened edge 114 of said blank 100.

In one embodiment, said upper grind angle 708 of said one or more upper grinders 406 can be adjusted automatically or by adjusting a mounting position of said upper grinder motor 700 to accomplish said upper grind angle 708.

In one embodiment, said mounting bracket 704 can move in said z-direction 416 on said vertical movement assembly 706 to adjust a height and engagement of said abrasive pad 604 with said blank 100.

Figure 8A:
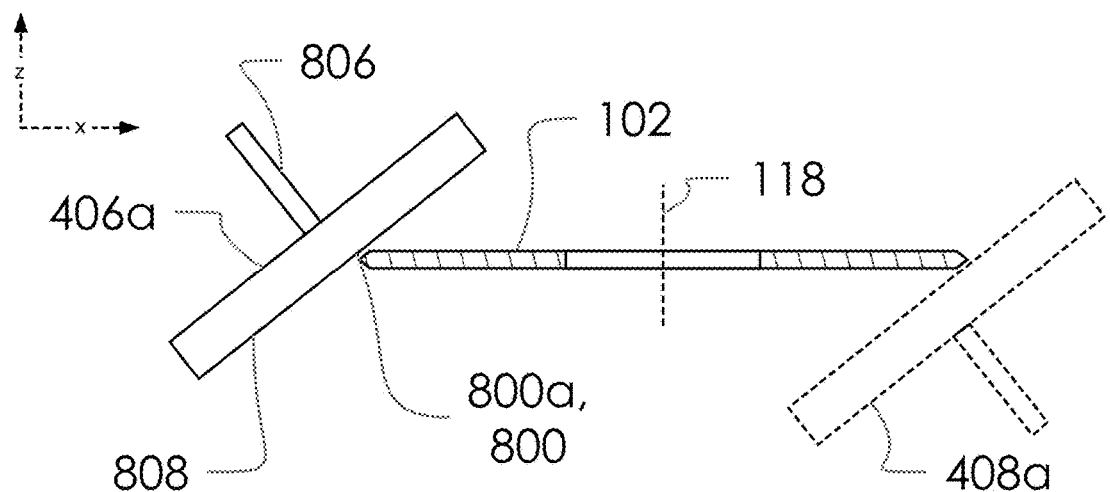
Figure 8B:
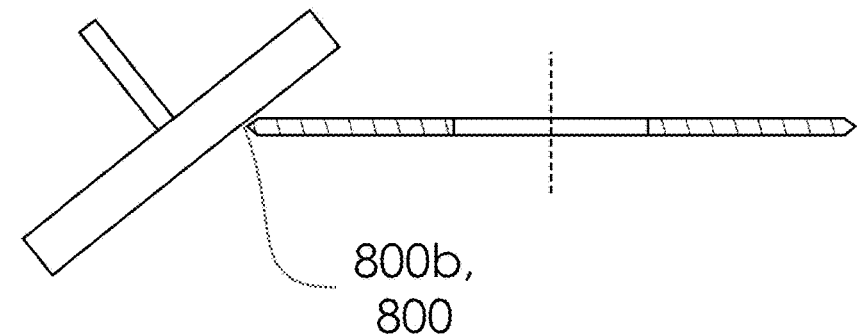
Figure 8C:
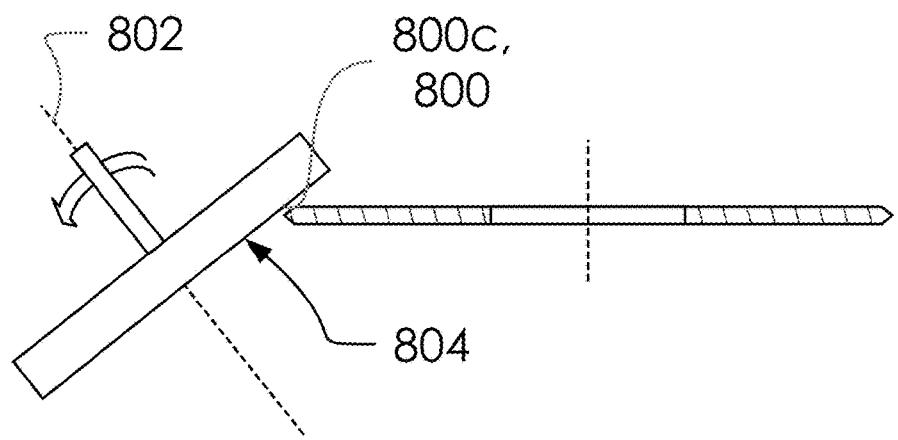

FIGS. 8A, 8B, and 8C illustrate a block diagram of said blade disk 102 with said first upper grinder 406*a* and said first lower grinder 408*a*.

By moving said one or more upper grinders 406 in said x-direction 412, said y-direction 414 and said z-direction 416, said gin blade sharpening system 400 can grind said top surface 204 at said outer perimeter edge 120 using different parts of each of said one or more upper grinders 406. In one embodiment, the portion of said one or more upper grinders 406 which touches said blade disk 102 during grinding can be referred to as a plurality of abrasive grinding points 800. As illustrated, said one or more upper grinders 406 can move to alter the location of said plurality of abrasive grinding points 800, which gives rise to the designations of a first abrasive grinding point 800*a*, a second abrasive grinding point 800*b*, and a third abrasive grinding point 800*c*.

In one embodiment, said one or more upper grinders 406 can rotate around a spinning axis 802. A distance between said spinning axis 802 and an outer edge of said one or more upper grinders 406 can comprise an interfacing portion 804 of said one or more upper grinders 406.

Each among said one or more upper grinders 406 can comprise a shaft 806 which can be attached to said upper grinder motor 700, and an abrasive pad 808 which can be attached to said shaft 806. In one embodiment, said abrasive pad 808 can comprise a round disk shaped consumable item, as is known in the art. Wherein, said interfacing portion 804 can comprise a radius of said abrasive pad 808.

In one embodiment, said controller 500 can measure usage of said abrasive pad 808 and move said one or more upper grinders 406 to ensure even wear of said abrasive pad 808 throughout all said plurality of abrasive grinding points 800. Said controller 500 can be configured to measure pad life, pressure applied, time applied, pad interface usage, RPM of said one or more upper grinders 406 as it spins.

Likewise, grinding duration can be measured to modify said grind angle 202.

Figure 9:
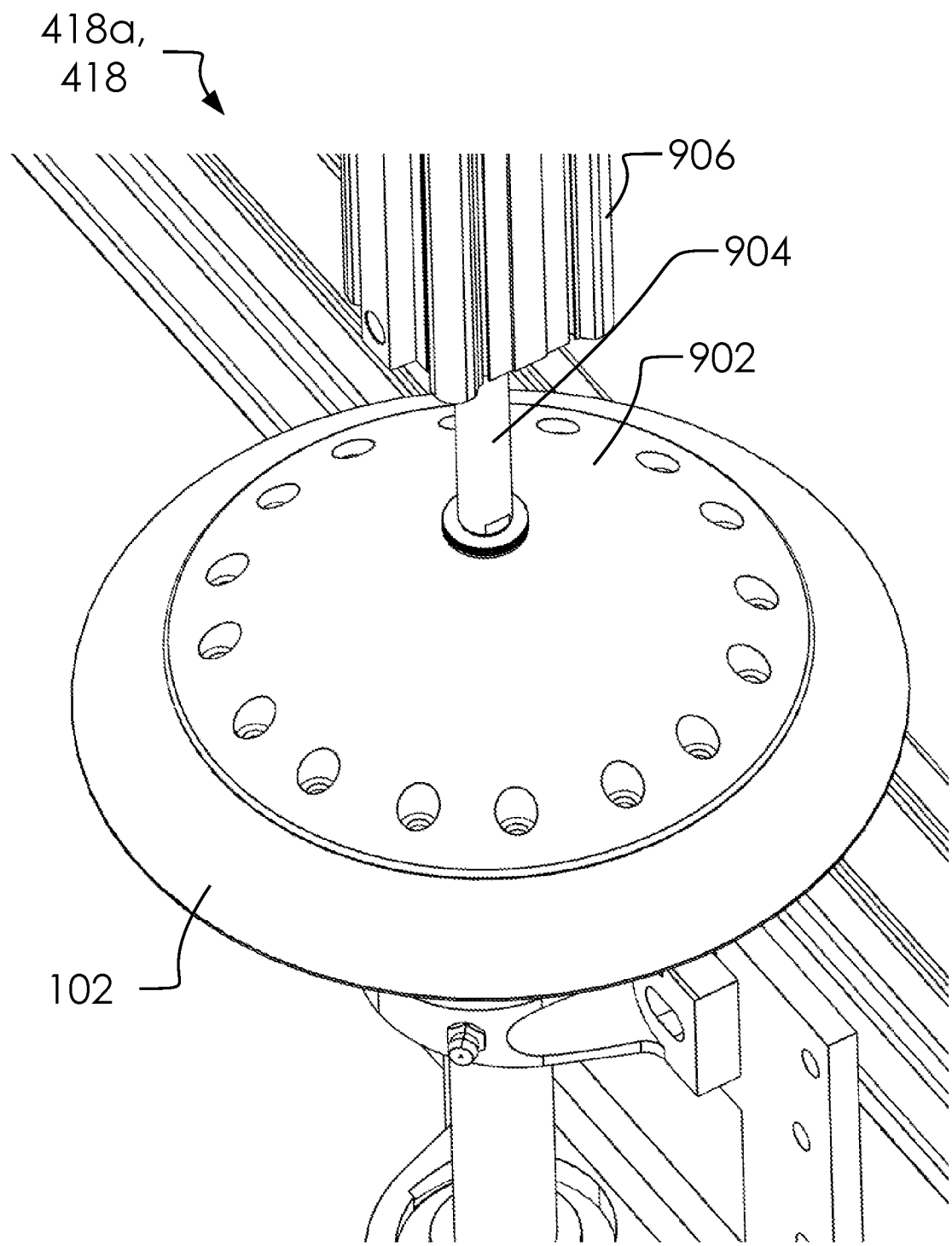
FIG. 9 illustrates a perspective overview of a first clamp assembly 418a with said blade disk 102 in an engaged configuration 900.

FIG. 9 illustrates a perspective overview of said first clamp assembly 418*a* with said blade disk 102 in an engaged configuration 900.

In one embodiment, each among said clamp assembly 418 can comprise an upper portion 902, an upper pressing shaft 904, and an upper press 906.

Figure 10A:
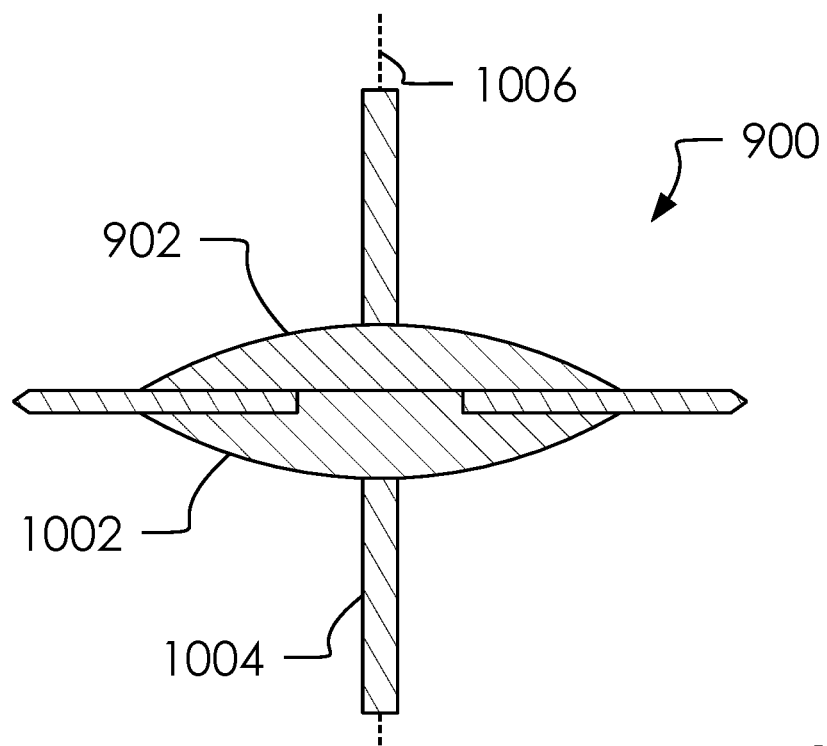
FIGS. 10A and 10B illustrate an elevated cross-section side view of said engaged configuration 900, a disengaged configuration 1000, and a detailed view of lower portion 1002.
Figure 10B:
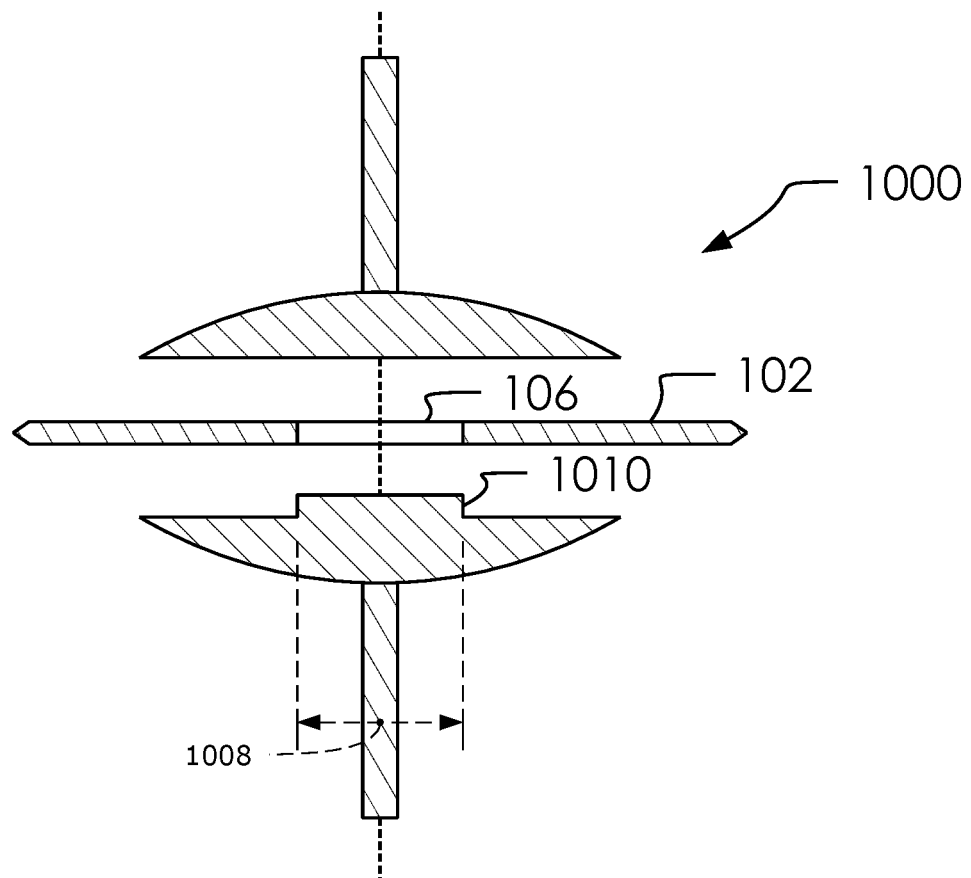

FIGS. 10A and 10B illustrate an elevated cross-section side view of said engaged configuration 900, a disengaged configuration 1000, and a detailed view of lower portion 1002.

In one embodiment, each among said clamp assembly 418 can further comprise said lower portion 1002, a lower shaft 1004, and a center axis 1006.

In one embodiment, said clamp assembly 418 can be configured to transition between said engaged configuration 900 and said disengaged configuration 1000 either manually or through a command generated within said controller 500.

Said engaged configuration 900 can comprise said blade disk 102 pressed between said upper portion 902 and said lower portion 1002; and said disengaged configuration 1000 can comprise said upper portion 902 and said lower portion 1002 separated to release said blade disk 102.

In one embodiment, either said upper portion 902 or said lower portion 1002 can comprise an aperture base 1010 having a base diameter 1008 being substantially equal to said center aperture diameter 122. Accordingly, with said clamp assembly 418 in said engaged configuration 900, a portion of said aperture base 1010 can fit within said center aperture 106 of said blade disk 102 so as to keep said blade disk 102 centered with said center point 118 at said center axis 1006 of said clamp assembly 418.

Figure 11:
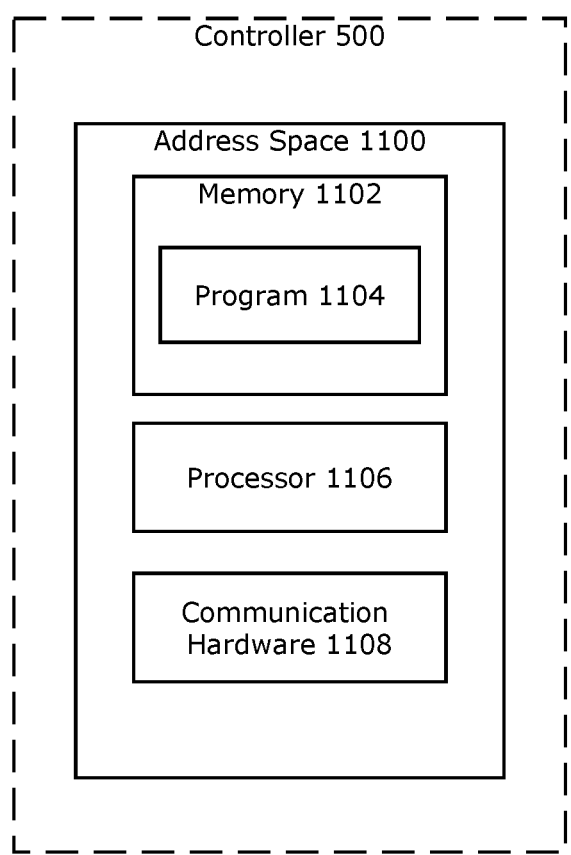
FIG. 11 illustrates a block diagram of an address space 1100 associated with a controller 500.

FIG. 11 illustrates a block diagram of an address space 1100 associated with said controller 500.

Said address space 1100 can comprise a memory 1102 storing a device program 1104, one or more processors 1106, and a communication hardware 1108.

In one embodiment, said device program 1104 can be configured to control said two or more grinding stations 404, said one or more upper grinders 406, said one or more lower grinders 408, and said upper grinder position control assembly 410 of said gin blade sharpening system 400.

The following is a summary of the enumerated parts in the specification and drawings:

said blank 100,
Said blade disk 102,
Said body portion 104,
Said center aperture 106,
Said diameter 108,
Said center aperture diameter 122,
Said detailed call-out 110,
Said plurality of punched teeth 112,
Said sharpened edge 114,
Said tooth orientation 116,
Said center point 118,
Said outer perimeter edge 120,
Said unsharpened punched blank,
Said call-out 200,
Said grind angle 202,
Said top surface 204,
Said bottom surface 206,
Said prior art grinding assembly 300,
Said plurality of spinning stations 302,
Said first station 304,
Said second station 306,
Said gin blade sharpening system 400,
Said frame structure 402,
Said two or more grinding stations 404,
Said one or more upper grinders 406,
Said one or more lower grinders 408,
Said upper grinder position control assembly 410,
Said clamp assembly 418,
Said first grinding station 404a,
Said second grinding station 404b,
Said third grinding station 404c,
Said first upper grinder 406a,
Said second upper grinder 406b,
Said first lower grinder 408a,
Said second lower grinder 408b,
Said first clamp assembly 418a,
Said second clamp assembly 418b,
Said third clamp assembly 418c,
Said x-direction 412,
Said y-direction 414,
Said z-direction 416,
Said x-axis threaded shaft 420,
Said y-axis threaded shaft 422,
Said switch panel interface 424,
Said controller 500,
Said controller box 502,
Said HMI 504,
Said first x-axis location 600,
Said second x-axis location 602,
Said abrasive pad 604,
Said upper grinder motor 700,
Said mounting bracket 704,
Said vertical movement assembly 706,
Said upper grind angle 708,
Said plurality of abrasive grinding points 800,
Said first abrasive grinding point 800a,
Said second abrasive grinding point 800b,
Said third abrasive grinding point 800c,
Said spinning axis 802,
Said interfacing portion 804,
Said shaft 806,
Said abrasive pad 808,
Said engaged configuration 900,
Said upper portion 902,
Said upper pressing shaft 904,
Said upper press 906,
Said disengaged configuration 1000,
Said lower portion 1002,
Said lower shaft 1004,
Said center axis 1006,
Said aperture base 1010, Said base diameter 1008,
Said address space 1100,
Said memory 1102,
Said device program 1104,
Said one or more processors 1106, and
said communication hardware 1108.

The following is a summary of the claims to ensure a matching disclosure with the claims:

Said prior art grinding assembly 300 said gin blade sharpening system 400 for sharpening said blank 100 into said blade disk 102. Said gin blade sharpening system 400 comprises said two or more grinding stations 404, said controller 500, and said one or more upper grinders 406. Said one or more upper grinders 406 comprise at least said first upper grinder 406a. Said two or more grinding stations 404 comprise at least said first grinding station 404a and said second grinding station 404b. Each among said two or more grinding stations 404 comprise said clamp assembly 418 configured to selectively hold said blade disk 102 in a substantially horizontal position. a portion of said one or more upper grinders 406 can be configured to sharpen said outer perimeter edge 120 of said blade disk 102 using said abrasive pad 604. Said controller 500 can be configured to selectively operate said two or more grinding stations 404, said one or more upper grinders 406 and said one or more lower grinders 408 using said device program 1104. Said gin blade sharpening system 400 comprises said upper grinder position control assembly 410 configured to move said one or more upper grinders 406 between said two or more grinding stations 404. Said one or more upper grinders 406 can be configured to travel between said first x-axis location 600 and said second x-axis location 602 using said upper grinder position control assembly 410. Said first x-axis location 600 and said second x-axis location 602 correspond to said first grinding station 404a and said second grinding station 404b. Said device program 1104 can be configured to schedule use of said one or more upper grinders 406 as between said two or more grinding stations 404. At least two among said two or more grinding stations 404 can be configured to rotate in an advantageous direction to avoid grinding into said tooth orientation 116. Said gin blade sharpening system 400 can be configured to sharpen said top surface 204, and said bottom surface 206 separately in said first grinding station 404a and said second grinding station 404b. By sharpening said top surface 204 and said bottom surface 206 separately, said blank 100 results in a flatter said blade disk 102, with lower consumption of said abrasive pad 604.

Said prior art grinding assembly 300 said gin blade sharpening system 400 for sharpening said blank 100 into said blade disk 102. Said gin blade sharpening system 400 comprises said two or more grinding stations 404, said controller 500, and said one or more upper grinders 406. Said one or more upper grinders 406 comprise at least said first upper grinder 406a. Said two or more grinding stations 404 comprise at least said first grinding station 404a and said second grinding station 404b. Each among said two or more grinding stations 404 comprise said clamp assembly 418 configured to selectively hold said blade disk 102 in a substantially horizontal position. a portion of said one or more upper grinders 406 can be configured to sharpen said outer perimeter edge 120 of said blade disk 102 using said abrasive pad 604. Said controller 500 can be configured to selectively operate said two or more grinding stations 404, said one or more upper grinders 406 and said one or more lower grinders 408 using said device program 1104. Said gin blade sharpening system 400 comprises said upper grinder position control assembly 410 configured to move said one or more upper grinders 406 between said two or more grinding stations 404. Said one or more upper grinders 406 can be configured to travel between said first x-axis location 600 and said second x-axis location 602 using said upper grinder position control assembly 410. Said first x-axis location 600 and said second x-axis location 602 correspond to said first grinding station 404a and said second grinding station 404b. Said device program 1104 can be configured to schedule use of said one or more upper grinders 406 as between said two or more grinding stations 404. at least two among said two or more grinding stations 404 can be configured to rotate in an advantageous direction to avoid grinding into said tooth orientation 116. Said gin blade sharpening system 400 can be configured to sharpen said top surface 204, and said bottom surface 206 separately in said first grinding station 404a and said second grinding station 404b. by sharpening said top surface 204 and said bottom surface 206 separately, said blank 100 results in a flatter said blade disk 102, with lower consumption of said abrasive pad 604.

Said gin blade sharpening system 400 for sharpening said blade disk 102 with improved manufacturing characteristics and higher quality output of said blade disk 102. Said gin blade sharpening system 400 comprises said two or more grinding stations 404, said controller 500, and said one or more upper grinders 406. Said one or more upper grinders 406 comprise at least said first upper grinder 406a. Said two or more grinding stations 404 comprise at least said first grinding station 404a and said second grinding station 404b. Each among said two or more grinding stations 404 comprise said clamp assembly 418 configured to selectively hold said blade disk 102 in a substantially horizontal position. a portion of said one or more upper grinders 406 can be configured to sharpen said outer perimeter edge 120 of said blade disk 102 using said abrasive pad 604. Said controller 500 can be configured to selectively operate said two or more grinding stations 404, said one or more upper grinders 406 and said one or more lower grinders 408 using said device program 1104.

Each among said clamp assembly 418 comprises said upper portion 902, said upper pressing shaft 904, said upper press 906, said lower portion 1002, said lower shaft 1004, and said center axis 1006. Said clamp assembly 418 can be configured to transition between said engaged configuration 900 and said disengaged configuration 1000 either manually or through a command generated within said device program 1104. Said engaged configuration 900 comprises said blade disk 102 pressed between said upper portion 902 and said lower portion 1002. Said disengaged configuration 1000 comprises said upper portion 902 and said lower portion 1002 separated to allow said blank 100 to be removed from said clamp assembly 418. Either said upper portion 902 or said lower portion 1002 comprises said aperture base 1010 having said base diameter 1008 being substantially equal to said center aperture diameter 122. with said clamp assembly 418 in said engaged configuration 900, a portion of said aperture base 1010 fit within said center aperture 106 of said blade disk 102 to keep said blade disk 102 centered with said center point 118 at said center axis 1006 of said clamp assembly 418.

Said gin blade sharpening system 400 comprises said upper grinder position control assembly 410 configured to move said one or more upper grinders 406 between said two or more grinding stations 404. Said one or more upper grinders 406 can be configured to travel between said first x-axis location 600 and said second x-axis location 602 using said upper grinder position control assembly 410. Said first x-axis location 600 and said second x-axis location 602 correspond to said first grinding station 404a and said second grinding station 404b. Said device program 1104 can be configured to schedule use of said one or more upper grinders 406 as between said two or more grinding stations 404.

Said upper grinder position control assembly 410 comprises said x-axis threaded shaft 420 and said y-axis threaded shaft 422. Said gin blade sharpening system 400 can be configured to selectively rotate said x-axis threaded shaft 420 and said y-axis threaded shaft 422 to move said upper grinder position control assembly 410.

At least two among said two or more grinding stations 404 can be configured to rotate in an advantageous direction to avoid grinding into said tooth orientation 116. Said gin blade sharpening system 400 can be configured to sharpen said top surface 204, and said bottom surface 206 separately in said first grinding station 404a and said second grinding station 404b. By sharpening said top surface 204 and said bottom surface 206 separately, said blank 100 results in a flatter said blade disk 102, with lower consumption of said abrasive pad 604.

Said gin blade sharpening system 400 further comprises said one or more lower grinders 408. Said one or more lower grinders 408 can be positioned relative to said clamp assembly 418 for use on said bottom surface 206 and said outer perimeter edge 120 of said blank 100.

Said one or more upper grinders 406 and said one or more lower grinders 408 can be driven by a motor, such as an electric motor.

Said gin blade sharpening system 400 comprises said switch panel interface 424 for operator interaction with said gin blade sharpening system 400.

Each among said one or more upper grinders 406 comprises said upper grinder motor 700, said abrasive pad 604, and said vertical movement assembly 706. Said upper grinder motor 700 can be configured to selectively drive said abrasive pad 604.

Said mounting bracket 704 can be configured to receive and hold said upper grinder motor 700 with said abrasive pad 604 on said vertical movement assembly 706. Each among said one or more upper grinders 406 further comprise said mounting bracket 704. Said mounting bracket 704 can be configured to allow said upper grinder motor 700 and said abrasive pad 604 to mount at said upper grind angle 708. Each among said one or more upper grinders 406 can be adjusted to a pitch relative to said blank 100 to adjust said grind angle 202 in said sharpened edge 114 of said blank 100. Said upper grind angle 708 of said one or more upper grinders 406 can be adjusted automatically or by adjusting a mounting position of said upper grinder motor 700 to accomplish said upper grind angle 708. Said mounting bracket 704 can be configured to move in said z-direction 416 on said vertical movement assembly 706 to adjust a height and engagement of said abrasive pad 604 with said blank 100.

Said controller 500 can be configured to measure usage of said abrasive pad 808 and move said one or more upper grinders 406 to ensure even wear of said abrasive pad 808 throughout all said plurality of abrasive grinding points 800. Said controller 500 can be configured to measure a pad life, a pressure applied, a time applied, a pad interface usage, a RPM of said one or more upper grinders 406 as it spins.

By moving said one or more upper grinders 406 in said x-direction 412, said y-direction 414 and said z-direction 416, said gin blade sharpening system 400 can be configured to grind said top surface 204 at said outer perimeter edge 120 using different parts of each of said one or more upper grinders 406. The portions of said one or more upper grinders 406 which touch said blade disk 102 during grinding can be referred to as said plurality of abrasive grinding points 800. Said one or more upper grinders 406 can be configured to move to alter the location of said plurality of abrasive grinding points 800. Said one or more upper grinders 406 can be configured to rotate around said spinning axis 802. A distance between said spinning axis 802 and an outer edge of said one or more upper grinders 406 comprises said interfacing portion 804 of said one or more upper grinders 406.

Each among said one or more upper grinders 406 comprises said shaft 806 which can be attached to said upper grinder motor 700, and said abrasive pad 808 which can be attached to said shaft 806. Said abrasive pad 808 comprises a round disk shaped consumable item, as can be known in the art. Said interfacing portion 804 comprises a radius of said abrasive pad 808.

Said gin blade sharpening system 400 further comprises said one or more lower grinders 408. Said one or more lower grinders 408 can be positioned relative to said clamp assembly 418 for use on said bottom surface 206 and said outer perimeter edge 120 of said blank 100. Said controller 500 can be configured to track and alter said plurality of abrasive grinding points 800 of said one or more lower grinders 408 to preserve said one or more lower grinders 408 in the manner of said one or more upper grinders 406.

Said gin blade sharpening system 400 for sharpening said blade disk 102 with improved manufacturing characteristics and higher quality output of said blade disk 102. Said gin blade sharpening system 400 comprises said two or more grinding stations 404, said controller 500, and said one or more upper grinders 406. Said one or more upper grinders 406 comprise at least said first upper grinder 406a. Said two or more grinding stations 404 comprise at least said first grinding station 404a and said second grinding station 404b. Each among said two or more grinding stations 404 comprise said clamp assembly 418 configured to selectively hold said blade disk 102 in a substantially horizontal position. A portion of said one or more upper grinders 406 can be configured to sharpen said outer perimeter edge 120 of said blade disk 102 using said abrasive pad 604. Said controller 500 can be configured to selectively operate said two or more grinding stations 404, said one or more upper grinders 406 and said one or more lower grinders 408 using said device program 1104. At least two among said two or more grinding stations 404 can be configured to rotate in an advantageous direction to avoid grinding into said tooth orientation 116. Said gin blade sharpening system 400 can be configured to sharpen said top surface 204, and said bottom surface 206 separately in said first grinding station 404a and said second grinding station 404b. By sharpening said top surface 204 and said bottom surface 206 separately, said blank 100 results in a flatter said blade disk 102, with lower consumption of said abrasive pad 604. Said mounting bracket 704 can be configured to receive and hold said upper grinder motor 700 with said abrasive pad 604 on said vertical movement assembly 706. Each among said one or more upper grinders 406 further comprise said mounting bracket 704. Said mounting bracket 704 can be configured to allow said upper grinder motor 700 and said abrasive pad 604 to mount at said upper grind angle 708. Each among said one or more upper grinders 406 can be adjusted to a pitch relative to said blank 100 in order to adjust said grind angle 202 in said sharpened edge 114 of said blank 100. Said upper grind angle 708 of said one or more upper grinders 406 can be adjusted automatically or by adjusting a mounting position of said upper grinder motor 700 to accomplish said upper grind angle 708. Said mounting bracket 704 can be configured to move in said z-direction 416 on said vertical movement assembly 706 to adjust a height and engagement of said abrasive pad 604 with said blank 100.

Each among said clamp assembly 418 comprises said upper portion 902, said upper pressing shaft 904, said upper press 906, said lower portion 1002, said lower shaft 1004, and said center axis 1006. Said clamp assembly 418 can be configured to transition between said engaged configuration 900 and said disengaged configuration 1000 either manually or through a command generated within said device program 1104. Said engaged configuration 900 comprises said blade disk 102 pressed between said upper portion 902 and said lower portion 1002. Said disengaged configuration 1000 comprises said upper portion 902 and said lower portion 1002 separated to allow said blank 100 to be removed from said clamp assembly 418. either said upper portion 902 or said lower portion 1002 comprises said aperture base 1010 having said base diameter 1008 being substantially equal to said center aperture diameter 122. With said clamp assembly 418 in said engaged configuration 900, a portion of said aperture base 1010 fit within said center aperture 106 of said blade disk 102 to keep said blade disk 102 centered with said center point 118 at said center axis 1006 of said clamp assembly 418.

Said gin blade sharpening system 400 comprises said upper grinder position control assembly 410 configured to move said one or more upper grinders 406 between said two or more grinding stations 404. Said one or more upper grinders 406 can be configured to travel between said first x-axis location 600 and said second x-axis location 602 using said upper grinder position control assembly 410. Said first x-axis location 600 and said second x-axis location 602 correspond to said first grinding station 404a and said second grinding station 404b. Said device program 1104 can be configured to schedule use of said one or more upper grinders 406 as between said two or more grinding stations 404. Said upper grinder position control assembly 410 comprises said x-axis threaded shaft 420 and said y-axis threaded shaft 422. Said gin blade sharpening system 400 can be configured to selectively rotate said x-axis threaded shaft 420 and said y-axis threaded shaft 422 to move said upper grinder position control assembly 410.

Each among said one or more upper grinders 406 comprises said upper grinder motor 700, said abrasive pad 604, and said vertical movement assembly 706. Said upper grinder motor 700 can be configured to selectively drive said abrasive pad 604.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A gin blade sharpening system for sharpening a blade disk with improved manufacturing characteristics and higher quality output of said blade disk, wherein:
    said gin blade sharpening system comprises two or more grinding stations, a controller, and one or more upper grinders;
    said one or more upper grinders comprise at least a first upper grinder;
    said two or more grinding stations comprise at least a first grinding station and a second grinding station;
    each among said two or more grinding stations comprise a clamp assembly configured to selectively hold said blade disk in a substantially horizontal position;
    a portion of said one or more upper grinders are configured to sharpen an outer perimeter edge of said blade disk using an abrasive pad; and
    said controller is configured to selectively operate said two or more grinding stations, said one or more upper grinders, and one or more lower grinders using a device program;
    each among said one or more upper grinders comprises an upper grinder motor, said abrasive pad, and a vertical movement assembly;
    said upper grinder motor is configured to selectively drive said abrasive pad;
    a mounting bracket is configured to receive and hold said upper grinder motor with said abrasive pad on said vertical movement assembly;
    each among said one or more upper grinders further comprise said mounting bracket;
    said mounting bracket is configured to allow said upper grinder motor and said abrasive pad to mount at an upper grind angle;
    each among said one or more upper grinders are adjusted to a pitch relative to a blank to adjust a grind angle in a sharpened edge of said blank;
    said upper grind angle of said one or more upper grinders are adjusted automatically or by adjusting a mounting position of said upper grinder motor to accomplish said upper grind angle;
    said mounting bracket is configured to move in a z-direction on said vertical movement assembly to adjust a height and engagement of said abrasive pad with said blank;
    by moving said one or more upper grinders in an x-direction, a y-direction and said z-direction, said gin blade sharpening system is configured to grind a top surface at said outer perimeter edge using different parts of each of said one or more upper grinders;
    the portions of said one or more upper grinders which touch said blade disk during grinding are referred to as a plurality of abrasive grinding points;
    said one or more upper grinders are configured to move to alter the location of said plurality of abrasive grinding points;
    said one or more upper grinders are configured to rotate around a spinning axis; and
    a distance between said spinning axis and an outer edge of said one or more upper grinders comprises an interfacing portion of said one or more upper grinders.

2. The gin blade sharpening system of claim 1, wherein:
    each among said clamp assemblies comprise
        an upper portion, an upper pressing shaft, an upper press, a lower portion, a lower shaft, and a center axis;
    wherein each among said clamp assemblies are configured to transition between an engaged configuration and a disengaged configuration either manually or through a command generated within said device program;
    said engaged configuration comprises said blade disk pressed between said upper portion and said lower portion;
    said disengaged configuration comprises said upper portion and said lower portion separated to allow said blank to be removed from said clamp assembly;
    either said upper portion or said lower portion comprises an aperture base having a base diameter being substantially equal to a center aperture diameter; and
    with said clamp assembly in said engaged configuration, a portion of said aperture base fit within a center aperture of said blade disk to keep said blade disk centered with a center point at said center axis of said clamp assembly.

3. The gin blade sharpening system of claim 1, wherein:
    said gin blade sharpening system comprises an upper grinder position control assembly configured to move said one or more upper grinders between said first and second grinding stations;
    said one or more upper grinders are configured to travel between a first x-axis location and a second x-axis location using said upper grinder position control assembly;
    wherein said first grinding station is located at said first x-axis location, and said second grinding station is located at said second x-axis location; and
    said device program is configured to schedule use of said one or more upper grinders between said first and second grinding stations.

4. The gin blade sharpening system of claim 3, wherein:
    said upper grinder position control assembly comprises an x-axis threaded shaft and a y-axis threaded shaft; and
    said gin blade sharpening system is configured to selectively rotate said x-axis threaded shaft and said y-axis threaded shaft to move said upper grinder position control assembly.

5. The gin blade sharpening system of claim 1, wherein:
the first grinding station and the second grinding station are each configured to rotate to avoid grinding into a tooth orientation;
said gin blade sharpening system is configured to sharpen said top surface in said first grinding station and sharpen a bottom surface in said second grinding station; and
by sharpening said top surface and said bottom surface separately, said blank results in a flatter said blade disk, with lower consumption of said abrasive pads.

6. The gin blade sharpening system of claim 1, wherein:
said gin blade sharpening system further comprises said one or more lower grinders; and
for each among said two or more grinding stations,
said one or more lower grinders are positioned relative to said clamp assembly for use on a bottom surface and said outer perimeter edge of said blank.

7. The gin blade sharpening system of claim 1, wherein:
each among said one or more upper grinders is driven by said corresponding upper grinder motor, and each among said one or more lower grinders is driven by a corresponding lower grinder motor.

8. The gin blade sharpening system of claim 1, wherein:
said gin blade sharpening system comprises a switch panel interface for operator interaction with said gin blade sharpening system.

9. The gin blade sharpening system of claim 1, wherein:
said controller is configured to measure usage of said abrasive pad and move said one or more upper grinders to ensure even wear of said abrasive pad throughout all of said plurality of abrasive grinding points; and
said controller is configured to measure a pad life, a pressure applied, a time applied, a pad interface usage, an RPM of said one or more upper grinders while said one or more upper grinders rotate.

10. The gin blade sharpening system of claim 1, wherein:
each among said one or more upper grinders comprises a shaft which is attached to said upper grinder motor, and said abrasive pad is attached to said shaft;
said abrasive pad comprises a round disk shaped consumable item; and
said interfacing portion comprises a radius of said abrasive pad.

11. The gin blade sharpening system of claim 1, wherein:
said gin blade sharpening system further comprises said one or more lower grinders;
said one or more lower grinders are positioned relative to said clamp assembly for use on said bottom surface and said outer perimeter edge of said blank;
said controller is configured to track and alter a plurality of lower abrasive grinding points of said one or more lower grinders to preserve said one or more lower grinders;
wherein said controller preserves said one or more lower grinders by measuring usage of said abrasive pad and moving said one or more lower grinders to ensure even wear of said abrasive pad throughout all of said plurality of lower abrasive grinding points; and
said controller is configured to measure a pad life, a pressure applied, a time applied, a pad interface usage, an RPM of said one or more lower grinders while said one or more lower grinders rotate.

12. A gin blade sharpening system for sharpening a blade disk with improved manufacturing characteristics and higher quality output of said blade disk, wherein:
said gin blade sharpening system comprises two or more grinding stations, a controller, and one or more upper grinders;
said one or more upper grinders comprise at least a first upper grinder;
said two or more grinding stations comprise at least a first grinding station and a second grinding station;
each among said two or more grinding stations comprise a clamp assembly configured to selectively hold said blade disk in a substantially horizontal position;
a portion of said one or more upper grinders are configured to sharpen an outer perimeter edge of said blade disk using an abrasive pad;
said controller is configured to selectively operate said two or more grinding stations, said one or more upper grinders, and one or more lower grinders using a device program;
each among said one or more upper grinders comprises an upper grinder motor, said abrasive pad, and a vertical movement assembly;
said upper grinder motor is configured to selectively drive said abrasive pad;
a mounting bracket is configured to receive and hold said upper grinder motor with said abrasive pad on said vertical movement assembly;
each among said one or more upper grinders are adjusted to a pitch relative to a blank to adjust a grind angle in a sharpened edge of said blank;
said upper grind angle of said one or more upper grinders are adjusted automatically or by adjusting a mounting position of said upper grinder motor to accomplish said upper grind angle;
said mounting bracket is configured to move in a z-direction on said vertical movement assembly to adjust a height and engagement of said abrasive pad with said blank;
by moving said one or more upper grinders in an x-direction, a y-direction and said z-direction, said gin blade sharpening system is configured to grind a top surface at said outer perimeter edge using different parts of each of said one or more upper grinders;
the portions of said one or more upper grinders which touch said blade disk during grinding are referred to as a plurality of upper abrasive grinding points;
said one or more upper grinders are configured to move to alter the location of said plurality of upper abrasive grinding points;
said one or more upper grinders are configured to rotate around a spinning axis;
a distance between said spinning axis and an outer edge of said one or more upper grinders comprises an interfacing portion of said one or more upper grinders;
said gin blade sharpening system further comprises said one or more lower grinders;
said one or more lower grinders are positioned relative to said clamp assembly for use on a bottom surface and said outer perimeter edge of said blank;
said controller is configured to track and alter a plurality of lower abrasive grinding points of said one or more lower grinders to preserve said one or more lower grinders; and
by measuring usage of said abrasive pad and move said one or more lower grinders to ensure even wear of said abrasive pad throughout all of said plurality of lower abrasive grinding points.

13. The gin blade sharpening system of claim 12, wherein said controller is configured to measure a pad life, a pressure applied, a time applied, a pad interface usage, an RPM of said one or more lower grinders while said one or more lower grinders rotate.

14. The gin blade sharpening system of claim 12, wherein
- each among said one or more upper grinders comprises a shaft which is attached to said upper grinder motor, and said abrasive pad is attached to said shaft;
- said abrasive pad comprises a round disk shaped consumable item; and
- said interfacing portion comprises a radius of said abrasive pad.

* * * * *